United States Patent [19]

Boobar et al.

[11] Patent Number: 4,788,789
[45] Date of Patent: Dec. 6, 1988

[54] COLLAPSIBLE INSECT TRAP

[75] Inventors: Lewis R. Boobar; Michael R. Sardelis, both of Frederick; Walter M. Brown, III, Smithsburg, all of Md.

[73] Assignee: The United States of America as represented by the Secretary of the Army, Washington, D.C.

[21] Appl. No.: 135,275

[22] Filed: Dec. 21, 1987

[51] Int. Cl.⁴ .............................................. A01M 1/04
[52] U.S. Cl. .................................................... 43/113
[58] Field of Search .................. 43/107, 111, 113, 114

[56] References Cited

U.S. PATENT DOCUMENTS

| | | | |
|---|---|---|---|
| 442,650 | 12/1890 | Tate | 43/113 |
| 779,672 | 1/1905 | Smith | 43/113 |
| 1,723,919 | 8/1929 | Bykowy | 43/113 |
| 4,157,629 | 6/1979 | Parks | 43/113 |
| 4,282,673 | 8/1981 | Focks et al. | 43/113 |

Primary Examiner—M. Jordan

[57] ABSTRACT

The invention is directed to a collapsible insect trap. Containing a light source, a fan, and a collection jar, the invention is constructed so that its body and legs can telescope, thereby permitting it to be significantly reduced in size from its operational configuration for transport or storage. Constructed, in part, of polyvinyl chloride pipe and aluminum, the invention is extremely lightweight, durable, and reliable.

10 Claims, 2 Drawing Sheets

4,788,789

COLLAPSIBLE INSECT TRAP

BACKGROUND OF THE INVENTION

This invention relates to insect traps and, more specifically, to an insect trap which is collapsible.

Because mosquitoes and other flying insects are carriers of various diseases those concerned with public health have for many years considered it important to sample flying insect populations at various locations. With such samples they can determine the risk of disease to nearby human and animal populations and evaluate insect control efforts. Much of this work has been undertaken by the Public Health Service and the Department of the Army.

Mosquito traps using as basic elements a vertical tube, an attracting light, and a fan for blowing mosquitoes into a bag made of netting have been known for many years. Some of the better known and most commonly used light traps are the Communicable Disease Center (CDC) Miniature developed by the CDC of the Public Health Service, the Monks Wood (MW), the Solid State Army Miniature (SSAM), and the Model 50 New Jersey. The CDC, MW, and SSAM are designed to collect live specimens for disease vector or rearing studies, and the New Jersey trap to sample mosquitoes for determining population density and diversity, and monitoring the efficacy of mosquito control efforts. Other insect traps have also been previously described. See U.S. Pat. Nos. 1,231,877; 1,445,906; 2,931,127; 3,120,075; 3,201,893; and 4,282,673.

The traps discussed above, however, all suffer from one or more of several disadvantages. Specifically, they are relatively bulky and cannot be collapsed for easy transport, they are also relatively heavy, and, under the rigor of field conditions, they are not as durable, and, therefore, as reliable, as they should be.

SUMMARY OF THE INVENTION

The disadvantages of the devices described above are solved, to a great extent, through the practice of the invention.

Illustratively, the body of the trap is comprised of upper and lower body sections with the dimensions of each designed to permit the upper body section to slide completely into the lower body section. Rods are contained and slidably move in rod sleeves which are attached to the upper body section. In turn, the trap lid is attached to the rods. The rods can be extended out of the rod sleeves allowing the lid to be raised and then lowered to fit on top of the upper body section. Telescoping legs are pivotally attached to the lower body section. The legs when extended and swung away from the trap body form a tripod to support the trap. For transport or storage, they can be retracted and held against the lower body section.

The interior of the trap contains and supports a light source, controlled by a photocell, to attract the insects, a motor and fan to draw the insects into the trap, and a collection means or assembly to retain the insects. To decrease weight, parts of the trap are made of polyvinyl chloride pipe and aluminum. Materials and, as will be seen in the detailed description of the invention, state of the art technology used in constructing the trap result in increased durability and, hence, reliability.

When in use the upper body section is extended out of the lower body section, the lid is raised using the adjustable length rods, and the legs are telescoped and swung away from the lower body section. The light and motor are activated, mosquitoes are drawn into the trap and retained in the collection means or assembly. When being packed for transport or storage, the above procedure is reversed, reducing the outer dimensions of the trap essentially to that of the dimensions of the lower body section.

Thus, the invention provides a collapsible, lightweight, and durable insect trap which is, therefore, easily transportable and reliable in the field.

For a more complete appreciation of the invention, attention is invited to the following detailed description of a preferred embodiment of the invention taken with the figures of the drawings. The scope of the invention, however, is limited only through the claims appended hereto.

DETAILED DESCRIPTION OF THE PREFERRED EMBODIMENT

Figure 1:
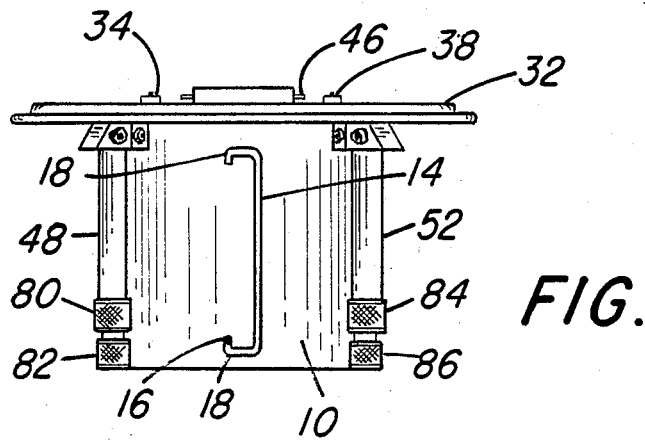
FIG. 1 is an elevational view of the invention when collapsed.
Figure 2:
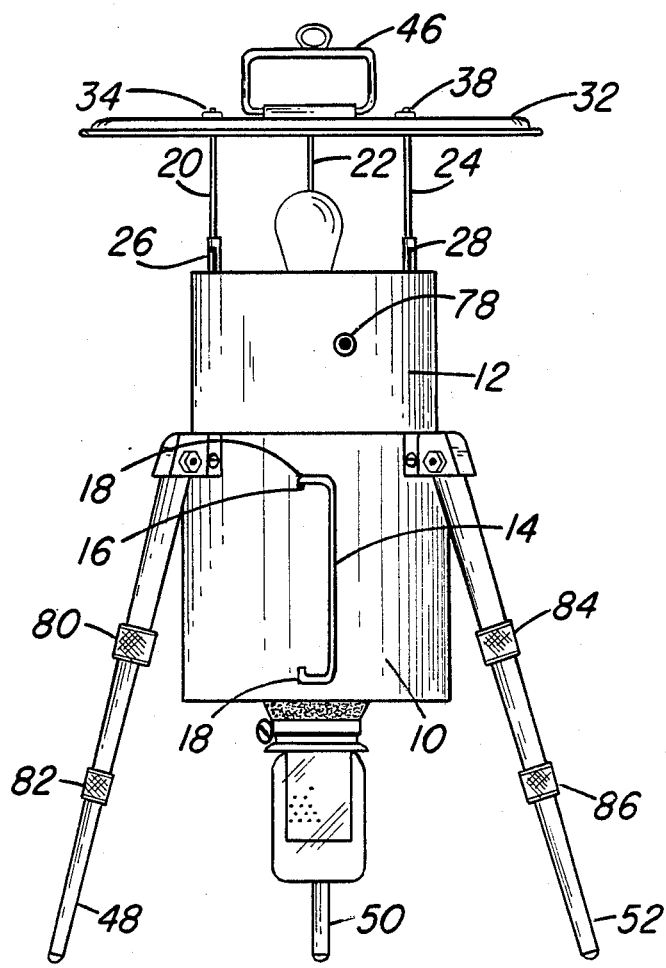
FIG. 2 is an elevational view of the invention when extended and ready to operate.

FIGS. 1 and 2 show an embodiment of the invention which illustrates the collapsibility of the invention, one of its key features.

In this embodiment, the main body of the trap consists of a lower body section 10 and an upper body section 12. Each section is made of 0.48 cm thick polyvinyl chloride (PVC) pipe with the inside diameter of the lower body section 10 being 20.2 cm and the outside diameter of the upper body section 12 being 20.0 cm. As can be seen, the relative dimensions of the upper and lower body sections permit the upper body section 12 to move slidably in and out of the lower body section 10. This, in turn, allows the body to be extended for operation and collapsed for transportation or storage.

The upper and lower body sections are connected and yet able to move slidably relative to each other by three pin and slot systems. In FIGS. 1 and 2, a slot 14 (the second and third slots are not shown; in this embodiment, the slot 14 is in the shape of a modified bracket:[]) is cut through the side of the lower body section 10. A pin 16 (the second and third pins are also not shown), attached to and extending outwardly from the side of the upper body section 12, travels in the slot 14. This permits the trap body to be extended and collapsed but prevents separation of the upper and lower body sections. Furthermore, the vertical tips 18 on the horizontal arms of the bracket-shaped slot 14 prevent the pin 16 from accidentally moving to the long vertical portion of the slot 14 and causing an inadvertent extension or collapse of the trap body.

Adjustable rods 20, 22, 24 move slidably in rod sleeves 26, 28 (one rod sleeve is not shown) said rod sleeves being attached to the mounting ring 30 (FIG. 4) which, in turn, is attached to the upper body section 12. The rods 20, 22, 24 support a 35.6 cm in diameter by 1.9 cm deep aluminum lid 32 which is used as a rain shield. Attached to the top of the lid 32 is a handle 46 which can be used to hang the trap during operation and to handle and/or carry it during transportation.

The height of the lid 32 is adjusted through the use of the rods 20,22,24 and rod sleeves 26,28 (plus the one not shown) which have three height settings or positions. The lowest position is used during storage and transportation and the other two positions are used during operation to accomodate light sources of different dimensions.

The length of the rods 20,22,24 and, hence, the height of the lid 32, are adjusted through the use of a pin and slot system similar to that described above for the trap body. Each rod sleeve has a slot comprised of a vertical portion and horizontal portions which branch off from the vertical portion. Each rod has a pin extending therefrom and into the slot in the rod sleeve in which the pin travels. The pins may be moved by turning each rod individually or, simultaneously, through the use of a mechanical system such as that shown in FIG. 3.

Figure 3:
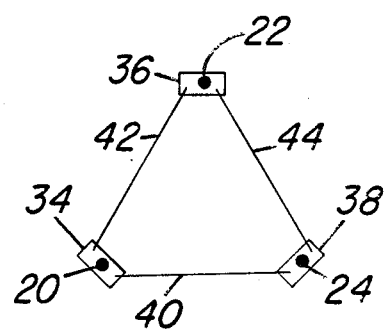
FIG. 3 is a plan view of the rod turning system of the invention.

In FIG. 3, the tops of rods 20,22,24 project through the lid 32 and are attached to nuts 34,36,38 such that when a nut is rotated the rod to which it is attached turns with it. Each nut 34,36,38 is connected with the other two nuts by bars 40,42,44. Therefore, when one nut is rotated in order to turn one rod, the other nuts are rotated simultaneously, thereby turning, as well, the rods to which they are attached. Thus this system provides an easy method for turning all rods simultaneously and allowing for rapid adjustment of the length of the rods 20,22,24 and the height of the lid 32.

Another important aspect of the invention's collapsibility feature is its telescoping legs 48,50,52. Made of aluminum, the legs 48,50,52 are pivotally attached to the lower body section 10 providing a built-in tripod for support. When the trap is collapsed or supported by the handle 46, the legs 48,50,52 are retracted and held in place against the lower body section 10 by a spring-loaded detent (not shown) in the leg mounting bracket (shown but not numbered). The legs 48,50,52 are fixed in an extended position by turning threaded sleeves 80,82,84,86 located on a larger diameter section of leg thereby tightening and simultaneously compressing the smaller in diameter leg section extending therefrom.

Figure 4:
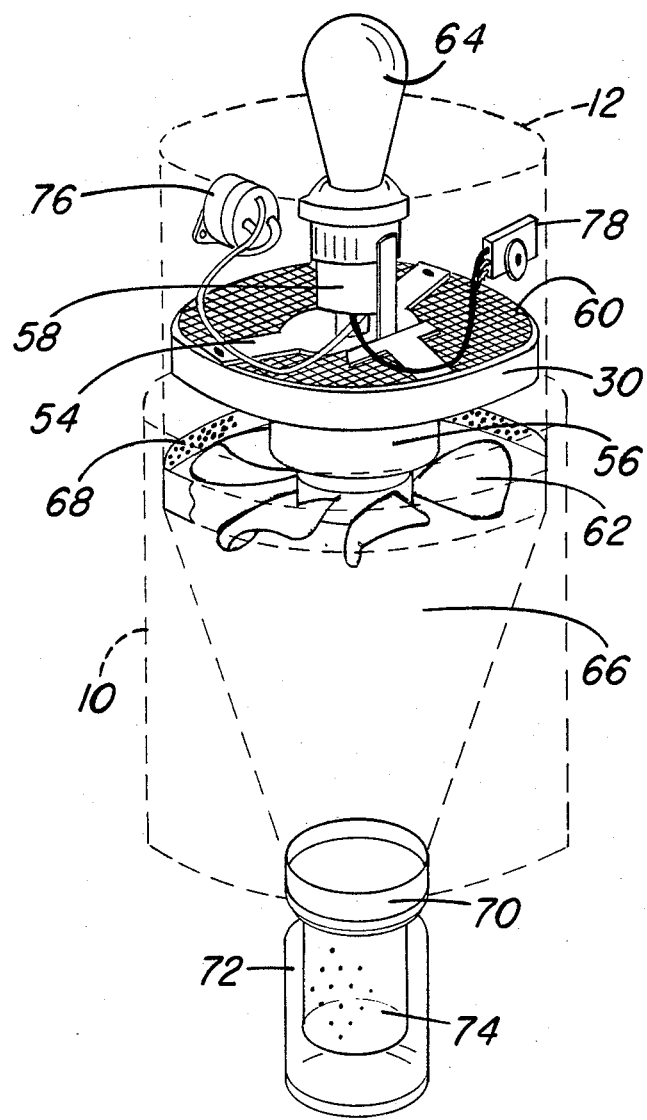
FIG. 4 is an illustration of the interior of the invention.

FIG. 4 illustrates an embodiment of the invention's interior. An aluminum mounting ring 30 is attached to the interior of the upper body section 12. A support frame 54 has three radiating arms which are attached to the mounting ring 30. Together, the mounting ring 30 and the support frame 54 allow attachment of and support the motor 56 and light source holder 58. A hardware-cloth screen 60 with 0.64 cm ($\frac{1}{4}$ in) mesh is seated horizontally on the mounting ring 30 to exclude larger insects. The motor 56 used in this embodiment is a totally enclosed 1/60 hp motor made by Fasco Industries, Inc., Boca Raton, Fla. This motor 56 together with a 16.8 cm rigid thermal plastic (RTP) fan 62 produces a 12 $m^3$ (425 $ft^3$)/min airflow. The airflow is determined using procedures similar to those described by Mulhern, T. D., (1948) a measuring instrument for determining accurately the displacement of air and consequently the mechanical efficiency of the New Jersey mosquito trap. *Proceedings of the 35th Annual Meeting of the New Jersey Mosquito Extermination Association*, pp. 90-94. The light source holder 58 (in this embodiment and shown in FIG. 4 for medium screw base bulbs) is mounted to the support frame 54 by an L-bracket and hose clamp.

In an effort to extend filament life, an axial-lead diode (not shown), rated at 1,000 peak inverse voltage (PIV) at 1 amp, was installed in the electrical system "upcurrent" from the light source 64. Installation of the diode was according to the method described by West, H. W. and Cashman, D. L. (1985) New Jersey light trap modification to extend bulb life. *Journal of the American Mosquito Control Association*, 1, 378-379.

The collection means or assembly consists of a 20.3 cm deep funnel 66 made of 22 mesh plastic screening which is attached at its wider end to the interior of the upper body section 12 through the use of a 1.9 cm-wide velcro strip 68. At the funnel's narrower end is attached a polypropylene mason jar lid 70 with a 6.0 cm diameter opening, to which is threadably connected a 500 ml polypropylene kill jar 72, containing a perforated plastic insert 74. The insert 74 is designed so that when in use its sides and bottom will not touch the jar 72 thereby preventing specimens in the collected sample from contacting the killing agent or condensate inside the jar.

The 110 volt AC current required to power the trap is supplied through a 3.0 m section of cord that connects to the upper body section 12 via a twist-lock jack 76. The jack 76 is attached to the interior of the upper body section 12. Access to the jack 76 is provided by an opening cut in the side of the upper body section 12. On and off cycles of the light source 64 were controlled by a photocell 78 which is this embodiment was made by Precision Multiple Control, Inc., Midland Park, N.J.

As previously noted, when ready for transport, the rods 20,22,24 supporting the lid 32, the upper body section 12, and the legs 48,50,52 all collapse in or onto the lower body section 10. In this embodiment, when the invention is collapsed, a 92.1 cm high trap is converted into a compact 24.1 cm high easily transportable configuration. The interior elements of the trap as described above, as well as the electric cord, can be packed inside the collapsed trap during storage and transportation. The trap is 62 percent shorter when collapsed and, due to the use of PVC pipe and aluminum in its construction, 33 percent lighter than the New Jersey trap.

The state of the art components used in the trap increase operational reliability of the invention. This was determined by cycling the motor 56 on and off 48,000 times over a 2,000 hour period and operating the motor 10,000 hours continuously all without a failure. Further, the photocell 78 was cycled on and off 5,500 times over a 1,000 hour period again without failure.

Durability testing was conducted to determine the trap's ability to withstand impact. The extended trap was dropped nine times from a height of four feet onto a hardwood surface. The trap was oriented differently for each drop. After nine drops, the trap was still serviceable with minor repairs (straightening the lid 32 and screen 60, etc.). The trap's survivability results from its PVC pipe construction and its relatively lightweight (4.4 kg compared to the New Jersey trap's weight of 6.6 kg).

The invention just described provides the researcher with a collapsible, lightweight, and durable insect trap. As a result, the trap is easily transportable and operationally reliable in the field.

We claim:

1. A collapsible insect trap comprising:
   (a) a lower body section;
   (b) an upper body section attached to said lower body section, said upper body section's dimensions permitting said upper body section to move slidably in and out of said lower body section;

(c) means for slidably connecting said lower body section to said upper body section;
(d) a rod sleeve attached to said upper body section;
(e) a rod which is contained and slidably moves in said rod sleeve;
(f) means for adjusting the length of said rod;
(g) a lid attached to said rod;
(h) means for supporting said trap attached to said lower body section;
(i) means for capturing insects; and
(j) means for collecting captured insects.

2. The collapsible insect trap as recited in claim 1, wherein said slidably connecting means comprises:
(a) a slot cut into the side of said lower body section; and
(b) a pin attached to and extending outwardly from said upper body section, said pin extending into and traveling in said slot.

3. The collapsible insect trap as recited in claim 1, wherein said rod length adjusting means comprises:
(a) a slot cut into the side of said rod sleeve; and
(b) a pin attached to and extending outwardly from said rod, said pin extending into and traveling in said slot.

4. The collapsible insect trap as recited in claim 1, wherein said trap supporting means is extendible and adjustable permitting said trap supporting means to vary in length.

5. The collapsible insect trap as recited in claim 1, wherein said trap supporting means comprises:
(a) at least three legs, each leg attached to said lower body section and comprised of at least two leg sections, one leg section being capable of fitting inside the other and moving slidably in relation thereto to permit the overall length of said leg to vary by telescoping the two leg sections; and
(b) a means for fixing said leg sections in relation to each other.

6. The collapsible insect trap as recited in claim 1, further comprising:
(k) a handle attached to said lid.

7. The collapsible insect trap as recited in claim 1, wherein said insect capturing means comprises:
(a) a mounting ring attached to said upper body section;
(b) a screen covering said mounting ring;
(c) a support frame attached to said mounting ring;
(d) a light source holder attached to said support frame;
(e) a light source inserted into said light source holder;
(f) a motor attached to said support frame;
(g) a fan blade rotatably attached to said motor; and
(h) means for connecting said holder and said motor to a power source.

8. The collapsible insect trap as recited in claim 7, wherein activation of said light source is controlled by a photocell.

9. The collapsible insect trap as recited in claim 1, wherein said insect collecting means comprises:
(a) a funnel comprised of screening and attached at said funnel's wider end to said upper body section:
(b) a jar lid attached to the narrower end of said funnel;
(c) a jar threadably attached to said jar lid; and
(d) an insert which is perforated and fits into said jar such that the sides and bottom of said insert are prevented from touching the sides and bottom of said jar.

10. A collapsible insect trap comprising:
(a) a lower body section;
(b) an upper body section attached to said lower body section, said upper body section's dimensions permitting said upper body section to move slidably in and out of said lower body section;
(c) means for slidably connecting said lower body section to said upper body section;
(d) a rod sleeve attached to said upper body section;
(e) a rod which is contained and slidably moves in said rod sleeve;
(f) means for adjusting the length of said rod;
(g) a lid attached to said rod;
(h) at least three legs, each leg attached to said lower body section and comprised of at least two leg sections, one leg section being capable of fitting inside the other and moving slidably in relation thereto to permit the overall length of said leg to vary by telescoping the two leg sections;
(i) a means for fixing said leg sections in relation to each other;
(j) a handle attached to said lid;
(k) a mounting ring attached to said upper body section;
(l) a screen covering said mounting ring;
(m) a support frame attached to said mounting ring;
(n) a light source holder attached to said support frame;
(o) a light source inserted into said light source holder;
(p) a motor attached to said support frame;
(q) a fan blade rotatably attached to said motor;
(r) means for connecting said holder and said motor to a power source;
(s) a funnel comprised of screening and attached at said funnel's wider end to said upper body section;
(t) a jar lid attached to the narrower end of said funnel;
(u) a jar threadably attached to said jar lid; and
(v) an insert which is perforated and fits into said jar such that the sides and bottom of said insert are prevented from touching the sides and bottom of said jar.

* * * * *